UNITED STATES PATENT OFFICE.

SAMUEL SCHUYLER MATTHEWS, OF KANSAS CITY, MISSOURI.

CACTUS SILAGE.

No. 866,496.　　　　Specification of Letters Patent.　　　　Patented Sept. 17, 1907.

Application filed July 2, 1906. Serial No. 324,333

*To all whom it may concern:*

Be it known that I, SAMUEL SCHUYLER MATTHEWS, a citizen of the United States, residing at Kansas City, in the county of Jackson and State of Missouri, have invented a new and useful Improvement in the Production of Cactus Silage, of which the following is a specification.

I have discovered that the leaves of the cactus plant, when dethorned or despined, and chopped into small pieces, may be used as a base for a silage or cattle food, taking the place of the chopped corn stalks which are now used for the same purpose. In connection with the cactus, the following other ingredients may be used in about the proportions given.

| | |
|---|---|
| Alfalfa or clover, green | 100 lbs. |
| Sugar cane or sorghum, green | 100 lbs. |
| Corn, stalks and grain, green | 100 lbs. |
| Linseed or cotton seed meal (oil not to be extracted therefrom) | 100 lbs. |

With the above named ingredients, about 2,000 lbs. of despined cactus is used and the entire mass chopped into small pieces, thoroughly mixed, and then placed in the usual silo where it remains for a period varying from 10 to 90 days.

What is claimed, is—

A composition of matter for use as a cattle food consisting of chopped despined cactus leaves ensiled with clover, sugar cane, and corn-stalks, in a green state, and linseed meal, in substantially the proportions disclosed.

SAMUEL SCHUYLER MATTHEWS.

Witnesses:
　DAVID V. RIEGER,
　SANDFORD T. LYNE.